United States Patent [19]

Peiler

[11] Patent Number: 5,028,032
[45] Date of Patent: Jul. 2, 1991

[54] BEARING ARRANGEMENT FOR SUPPORTING A SWINGING BODY

[75] Inventor: Rolf W. Peiler, Zweibrucken, Fed. Rep. of Germany

[73] Assignee: Deere & Company, Moline, Ill.

[21] Appl. No.: 499,159

[22] Filed: Mar. 26, 1990

[30] Foreign Application Priority Data

Apr. 1, 1989 [DE] Fed. Rep. of Germany ....... 3910539

[51] Int. Cl.⁵ ............................................. B60B 35/00
[52] U.S. Cl. .................................. 248/635; 248/611; 248/605
[58] Field of Search .............. 248/635, 560, 611, 605, 248/596, 606, 632

[56] References Cited

U.S. PATENT DOCUMENTS 3,448,992  6/1969  Wilfert et al. .

FOREIGN PATENT DOCUMENTS 2717405  4/1977  Fed. Rep. of Germany .
44438  5/1966  German Democratic Rep. .
637266  5/1950  United Kingdom ................ 248/605
942602  11/1963  United Kingdom ................ 248/635

Primary Examiner—Alvin C. Chin-Shue

[57] ABSTRACT

A bearing arrangement for the support of a swinging body. The bearing arrangement in which the swinging body is provided with a rotatable bearing shaft. The bearing shaft is supported in the bearing assemblies having deformable bearing bodies. The bearing bodies are provided with external conical surfaces that engage internal conical surfaces of associated bearing shells.

1 Claim, 1 Drawing Sheet

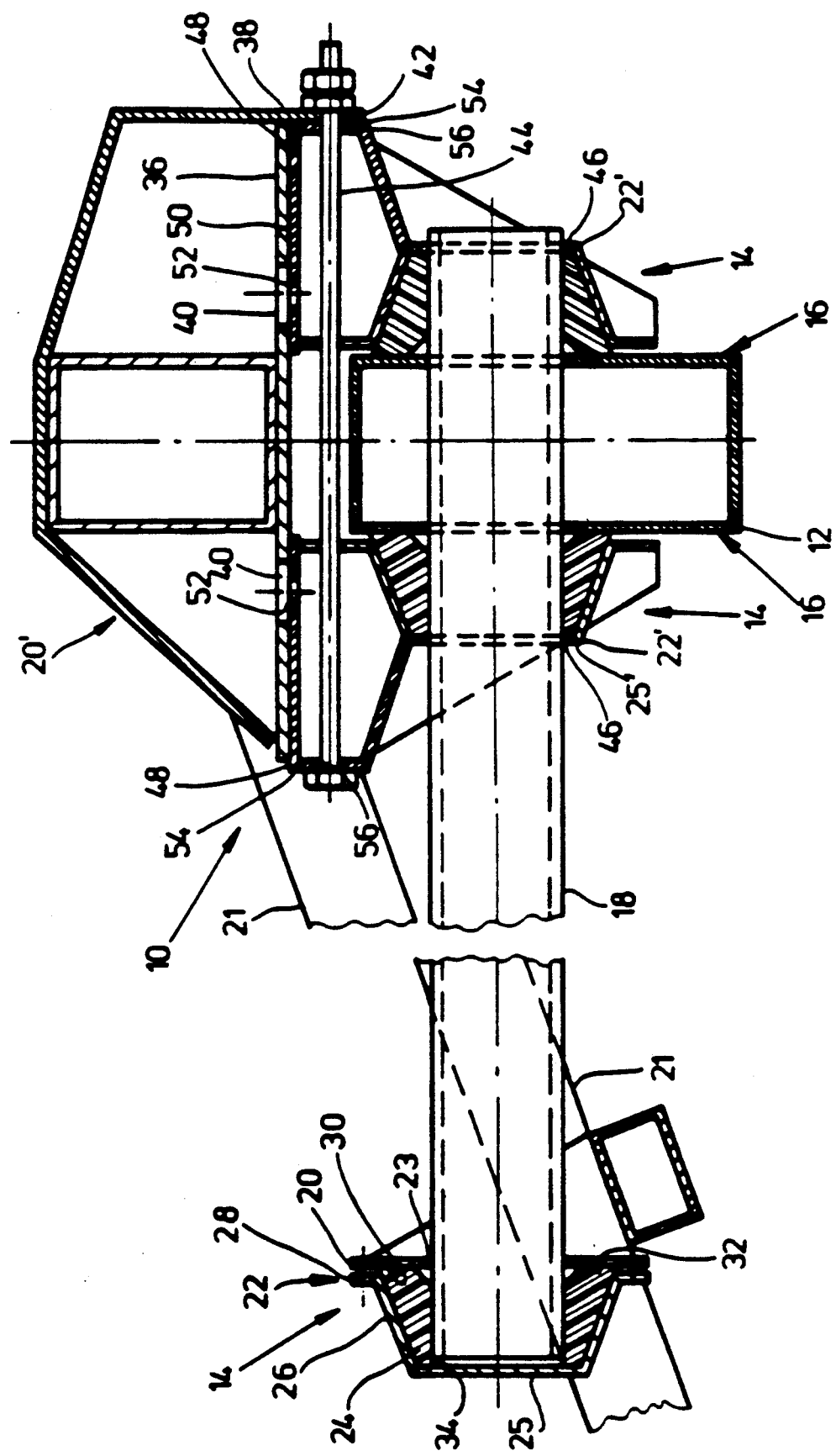

bearing arrangement for supporting a swinging body

BACKGROUND OF THE INVENTION

1. Field of the Invention

The invention is directed to a bearing arrangement to support a swinging body having a bearing shaft mounted in several bearing assemblies.

2. Description of the Prior Art

In a known bearing arrangement for a front axle on an agricultural tractor (DE-OS-2 717 405) a bearing shaft is provided centrally in the direction of the longitudinal axis of the agricultural tractor in the axle body, which is rotatably supported in cast iron or steel bearing supports. Similar supports are also found in combine rear axles, self-propelled forage harvesters, cotton pickers and the like.

This type of bearing arrangement has the disadvantage that the bearing surface must be manufactured with relatively high precision, and must be constantly lubricated because of the friction encountered. In addition, sometimes the entire bearing arrangement needs to be retightened.

SUMMARY

It is an object of the present invention of providing a bearing arrangement for a swinging body, such as the front or the rear axle of a motor vehicle, which is generally maintenance free.

The swinging body can move to a small degree relative to the bearing assemblies, without the occurrence of a sliding movement at any point. Vibration and shock loads are absorbed in the plastic or elastic deformations of the bearing bodies and are not transmitted to the vehicle chassis. Within the limit of the deformation of the material of the bearing bodies, no relative movement occurs between the bearing shaft and the bearing body, or between the bearing bodies and the bearing assemblies, but is accommodated through the deformation of the bearing body itself.

The use of adjustable bearing shells makes it possible to preload the bearing bodies between the bearing shells and the bearing shaft.

The swinging body can be fixed in space relative to the bearing assemblies. The bearing shells and the bearing bodies contained therein are configured conically and are axially .. moveable on their facing surfaces. Axial adjustment of the bearing shells provides a partial radial adjustment and a simultaneous increase in the preload of the bearing bodies.

The arrangement of the gaps around the edges of the bearing shells provides for a slight movement of the bearing shaft relative to the bearing assemblies, and the bearing bodies relative to the bearing assemblies. Such slight movements do not directly affect the bearing shells and the bearing assemblies.

BRIEF DESCRIPTION OF THE DRAWINGS

The drawing shows a side and a cross sectional view of a bearing arrangement 10 with a swinging body 12 and three bearing assemblies 14.

DETAILED DESCRIPTION

The bearing arrangement 10 is located in the area of a front axle (not shown) of an agricultural tractor or a rear axle of a harvesting machine. The bearing is arranged so that the swinging body 12, the front or the rear axle, can swing in a plane perpendicular to the plane of the drawing through an angle of approximately 12°-20°. The bearing arrangement extends symmetrically about or parallel to the longitudinal axis of the vehicle and includes, along in its longitudinal centerline, the three bearing assemblies 14. The first bearing assembly, seen at the left hand side of the drawing, is of a considerably greater distance from the other two bearing assemblies, compared to the distance between those two bearing assemblies.

The swinging body extends perpendicular to a centerline through the bearing assemblies 14 and is configured as a rectangular pipe in the illustrated embodiment. A bearing shaft 18 extends perpendicular to and through the side walls 16 of the swinging body 12. The bearing shaft 18 is rigidly connected to the side walls 16 and is free to rotate in the three bearing assemblies 14. Thanks to the arrangement of the bearing assemblies 14, the swinging body 12 is protected from torsional and bending moments induced in it by the bearing shaft 18.

The bearing assemblies 14 each consist of a retainer 20, 20', a bearing shell 22, 22' and a bearing body 24.

The retainer 20 of the first bearing assembly 14, is configured as a flange and is rigidly attached to a chassis 21 and oriented radially to the bearing shaft 18. In its central region, the retainer 20 is provided with an opening 23 whose diameter is greater than the outside diameter of the bearing shaft 18. The edge region of the retainer 20 is penetrated by holes which accept screws (not shown).

The bearing shell 22 of the first bearing assembly 14 is hat-shaped with a cover 25, a wall region 26 in the shape of an internal cone, and a flange 28 which is oriented parallel to the retainer 20. In the flange 28 there are provided holes (not shown) that are aligned with those in the retainer 20 and also accept screws. The interior of the bearing shell 22 is sufficiently large to accept the bearing shaft 18 with a bearing body 24.

The bearing body 24 is formed by an elastic plastic, that can be deformed, with good frictional qualities and configured as a hollow truncated cone. Its axial length is slightly greater than that of the interior of the bearing shell 22. A bottom 30 of the bearing body 24 is not level and flat, but is provided with a conformable lip 32. The outer angle of the truncated cone corresponds to the inner angle of the conical wall region 26. The diameter of a bore 34 passing through the bearing body 24 is slightly smaller than the outside diameter of the bearing shaft 18 in this area, so that the bearing body 24 must be press fitted on the bearing shaft 18.

As assembled, the bearing shaft 18, the retainer 20, the bearing shell 22 and the bearing body 24 are arranged concentric to each other. The bearing body 24 is inserted in the bearing shell 22 in such a way that the lip 32 can be brought into contact with the retainer 20.

The retainer 20' is also attached to the chassis 21 and provided at its underside with a sliding plate 36 which is connected at its right end with a rail 38. Elongated holes 40 are provided in the sliding plate 36, and extend in the longitudinal direction of the bearing shaft 18. The rail 38 is also penetrated by a hole 42 which accepts a clamping screw 44.

The left bearing shell 22' is identical to the right bearing shell 22'. Both bearing shells 22' are provided with a cover 25', a wall region 26' with internal conical shape, and a flange 28', as do the bearing shells 22. The only difference is that the covers 25' are each provided with an opening 46. The diameter of the opening, which is preferably round, is larger than the outside diameter of the bearing shaft 18 and, as a rule, identical to the diameter of the opening 23.

A mount 48 is provided for the attachment of the bearing shells 22' to the retainer 20' which engages the cover 25' and the flange 28'. The mount 48 extends upward to make contact with the sliding plate 36 of the retainer 20'. Each mount 48 has a five-sided cross section and its upper surface 50 contacts the sliding plate 36. The upper surface 50 is provided with at least one hole 52, through which a screw (not shown) can be inserted. Side walls 54 oriented perpendicular to the upper surface 50 of the mount 48 are each provided with a hole 56. The mount 48 with the bearing shell 22' are assembled with their upper surface 50 flat against the sliding plate 36, and are attached to the sliding plate 36 by one or more screws (not shown).

The bearing bodies 24 for the bearing shells 22' are identical to those of the bearing shells 22. In particular they are provided with the lip 32 although this is in contact with the swinging body 12.

To assemble the bearing arrangement 10, two bearing bodies 24 are initially mounted on the bearing shaft 18 and moved up to the swinging body 12, until their lips 32 are in contact with its opposing sides. Following this the left and the right mounts 48 are mounted concentrically on the corresponding sections of the bearing shaft 18 until they firmly surround the bearing bodies 24. The right and left mount 48 are oriented so that their upper sides 50 are indeed located at the top. Then the swinging body 12 with its bearing shaft 18 is brought to a horizontal position below the sliding plate 36 and at the same time the left end region of the bearing shaft 18 is guided through the opening 23 in the retainer 20. The swinging body 12 is lifted and moved sideways until the right mount 48 is firmly in contact with the inner surface of the rail 38. Then the two mounts 48 are secured to the sliding plate 36 by means of screws through the holes 52 and the elongated holes 40. In this position the holes 56 in the side walls 54 of the mount 48 and the hole 42 in the rail 38 are in alignment, so that the clamping screw 44 can be inserted through these holes 42, 56. Subsequently the left mount 48 and the bearing body 24 connected thereto is brought into contact with the swinging body 12 by means of the clamping screw 44, until all axial play has been taken up and the screws in the sliding plate 36 are tightened.

Finally a bearing body 24 and a bearing shell 22 are pressed onto the left end of the bearing shaft 18 which extends beyond the retainer 20. Then the bearing body 24 is brought into contact with the retainer 20 and the bearing shell 22 attached to it by screws.

Due to the various dimensions of the bearing shells 22, 22' and the bearing bodies 24, the completions of the assembly assures that a gap always remains between the swinging body 12 or the bearing shaft 18 and the bearing shells 22, 22' or the retainer 20 and the mounts 48. This gap permits movement within the limits of the material of the bearing bodies 24 of the swinging body 12 in the bearing arrangement 10.

Permanent set that may appear in the bearing bodies 24, that could contribute to clearance in the bearing arrangement 10 is eliminated by tightening the clamping screw 44.

I claim:

1. A bearing arrangement for supporting a vehicle axle, the bearing arrangement comprising:
   a swinging body configured as a rectangular pipe, the rectangular pipe having sidewalls;
   a rotatable bearing shaft having a longitudinal axis that extends perpendicular to and extends through the sidewalls of the rectangular pipe;
   three bearing assemblies engage the bearing shaft, each bearing assembly is provided with a deformable bearing body and an axially adjustable bearing shell, each bearing body having an external conical surface and an internal conical surface, each bearing shell can be adjusted axially with respect to the longitudinal axis of the bearing shaft for compressing the bearing bodies; and
   two of the bearing assemblies engage the sidewalls of the swinging body, the bearing shells of each of these two bearing assemblies are provided with openings for accommodating the bearing shaft, a gap is formed between the opening and the bearing shaft.

* * * * *